United States Patent
Lu

[15] 3,656,849
[45] Apr. 18, 1972

[54] MULTIPLE IMAGE SYSTEMS
[72] Inventor: Sun Lu, Dallas, Tex.
[73] Assignee: Texas Instruments Incorporated, Dallas, Tex.
[22] Filed: May 15, 1970
[21] Appl. No.: 37,793

Related U.S. Application Data
[62] Division of Ser. No. 617,349, Feb. 20, 1967, Pat. No. 3,529,887.

[52] U.S. Cl. ..................................355/46, 95/18, 96/27 H, 350/162 SF
[51] Int. Cl. ..........................................G02b 27/22
[58] Field of Search..............350/3.5, 162 SF; 95/18; 355/2, 355/46; 96/36.2, 43, 27 H

[56] References Cited
UNITED STATES PATENTS 3,449,049   6/1969   Harding et al. ........................95/18 X Primary Examiner—David Schonberg
Assistant Examiner—Robert L. Sherman
Attorney—Samuel M. Mims, Jr., James O. Dixon, Andrew M. Hassell, Harold Levine, Melvin Sharp, John E. Vandigriff and William E. Hiller

[57] ABSTRACT

A multiple image pattern is found from a single image master illuminated by a source of monochromatic light by establishing the Fourier transform of the light disturbance at the master image on a Fourier transform hologram of an array of points corresponding with the array of images to be formed, and establishing the Fourier transform of the light disturbance at the hologram on a light sensitive source.

1 Claim, 5 Drawing Figures

INVENTOR
SUN LU
ATTORNEY

INVENTOR
SUN LU

ATTORNEY

3,656,849

MULTIPLE IMAGE SYSTEMS

This application is a division of copending application Ser. No. 617,349, filed Feb. 20, 1967, now U.S. Pat. No. 3,529,887.

BACKGROUND OF THE INVENTION

Multiple images for a micro-miniature circuit are usually produced on the semiconductor wafer by a system using a single image master. Each image in the pattern must be an accurate reproduction of the master image and precisely spaced with respect to the surrounding images. The two basic requirements for repetition of a circuit pattern are the achievement of high image quality and precise registration between each image.

Presently, the highest quality multiple image patterns are produced by using elaborate step-and-repeat cameras with lenses of high aperture to give the necessary resolving power. With the step-and-repeat camera, a multiple image mask is constructed, and the image pattern transferred to a semiconductor wafer by the process of contact printing. To produce a 30-by-30 array on the mask, it is necessary to perform 900 exposures through the master image. For each of the 900 exposures, the master image must be positioned accurately within 0.0001 of an inch. Although the step-and-repeat camera produces the best results of previously available systems, it is a tedious, time-consuming, and expensive way to produce multiple images.

Another system for producing multiple images is the pinhole array camera. A pinhole array camera system consists of a mask having an array of precisely positioned, uniform diameter apertures. The resolution of the images formed by this system is controlled by the aperature size and the pinhole array to mask distance. Since the effective lens quality of a pinhole opening is very poor, the images produced by this method are of a lower quality than the step-and-repeat camera system. However, the pinhole array camera system is relatively simple and inexpensive.

Another desirable feature in multiple reproduction is the ability to produce intermixed arrays of several master images. Also, it is often desirable to produce complex patterns of a master image. The pinhole array camera system lacks the ability to produce intermixed multiple images from several patterns. In accordance with the present invention, a source of monochromatic light illuminates a master image and the Fourier transform of the master image is established on a hologram of an array of point sources corresponding with the array of images to be formed. A Fourier transform of the light wave disturbance at the hologram is then established on an element upon which the multiple images are to be registered. With the system of the present invention, intermixed multiple images are possible by several different methods. For example, the element is exposed through a first hologram and master and the multiple images are registered in a predetermined complex pattern; a second hologram and second master image is substituted for the first and the element is then exposed to the multiple images of the second master. This procedure can be repeated for any number of complex patterns and associated master images. It is also possible to produce intermixed multiple images simultaneously from a given number of master images. For simultaneous registration, a plurality of holograms, with each hologram representing an array of points corresponding with the array of images for a given master, are arranged on a single plate. Each master images is illuminated from a separate source and the Fourier transform of the light disturbance at each master is established on one of the hologram patterns. The Fourier transforms of the light disturbances at the various holograms is in turn established on the element thereby simultaneously producing an intermixed pattern from a given number of master images.

SUMMARY OF THE INVENTION

The present invention provides a system for producing high resolution multiple images of a master image on an element in a single step process. In accordance with the present invention, a light beam illuminates a master image, and a Fourier transform of the light disturbance at the master image is established at a hologram of an array of points corresponding with the number of multiple images desired. The Fourier transform of the light disturbance at the hologram is then established on the element where the multiple images are to be registered.

DESCRIPTION OF THE PREFERRED EMBODIMENTS

Figure 1:
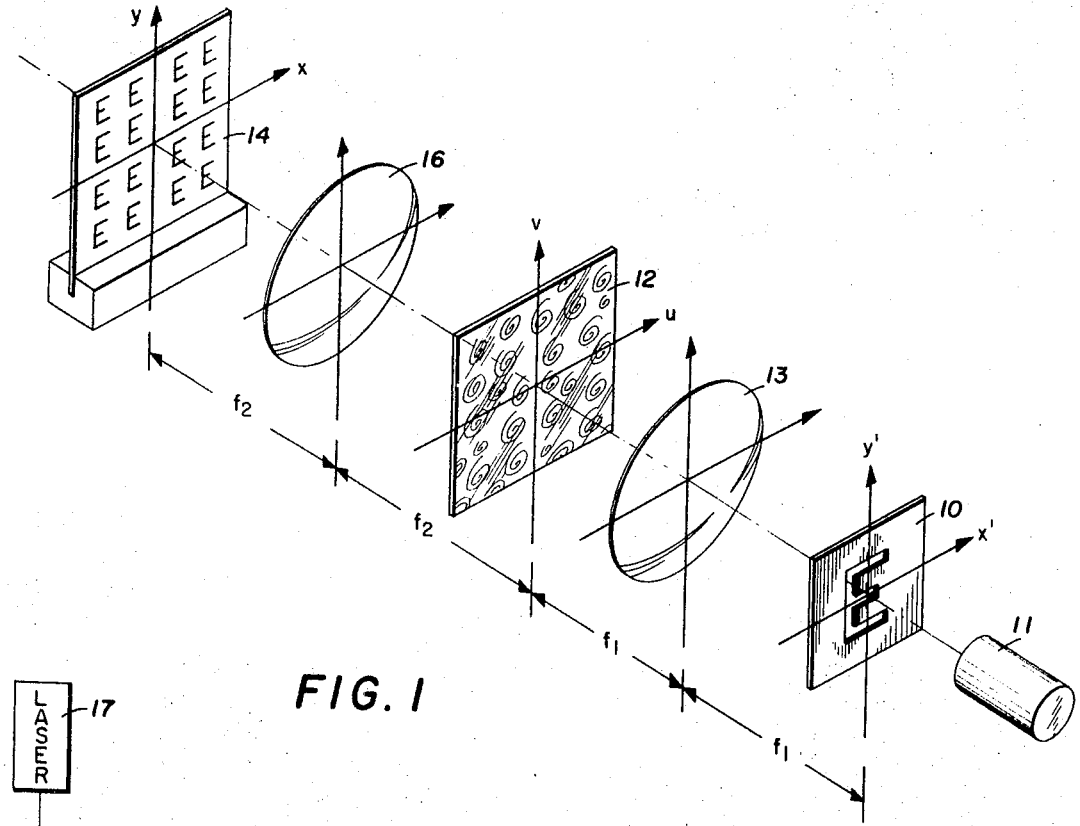
FIG. 1 is a diagrammatic of a system for producing in a single step a multiple image pattern from a single image master.

Referring to FIG. 1, there is shown a system for producing multiple images from one single-image master. The single-image master 10 is illuminated from a source of monochromatic light 11, for example, a laser. Light waves from the source 11 passing through the master image 10 produce a diffraction pattern; the Fourier transform of this pattern is established at a hologram 12 by means of a convex lens 13. The complex light pattern from the master image 10 passes through the hologram 12 thereby producing another complex diffraction pattern; the Fourier transform of this second pattern is established at the photosensitive surface of a body, such as a semiconductor wafer 14, supported in a holder 15, by means of a convex lens 16.

With the relatively simple system shown in FIG. 1, it is possible to produce, in a single step process, multiple images on the photosensitive surface of the semiconductor wafer 14 from the master image 10. The focal length of the convex lenses 13 and 16 determines the spacing between the various elements. For example, the distance between the master image 10 and the convex lens 13, and the distance between the hologram 12 and the convex lens 13, is determined by the focal length of the convex lens 13. Similarly, the distance between the hologram 12 and the convex lens 16, and the semiconductor wafer 14 and the convex lens 16 is determined by the focal length of the convex lens 16. The tolerances on the distances between the various elements is not critical.

In operation, consider that the master image 10 has a complex wave transmission function equal to $f(x', y')$, and that the master image is located on the focal plane $x'y'$ of the convex lens 13. If the hologram 12 is also located on a focal plane of the convex lens 13, identified as plane $uv$, then the lens 13 establishes the Fourier transform of the function $f(x', y')$ on the $uv$ plane. From well known diffraction and Fourier transform theory, the amplitude of the light waves on the hologram will be:

$$F(u,v) = \mathscr{F}(f[x',y']) = \int\int_{-\infty}^{\infty} f(x',y') e^{-i 2\pi f_1 \lambda (ux' + vy')} \quad (1)$$

where $f_1$ is the focal length of the lens 13 and $\lambda$ is the wavelength of the light from the source 11. If the hologram 12, located in the $uv$ plane, has a transmission function $G(u,v)$ then the amplitude of the light wave passing through the hologram is equal to the product of $F(u,v) \times G(u,v)$. Since the $uv$ plane is also a focal plane of the convex lens 16, the Fourier transform of the product of $F(u,v) \times G(u,v)$ will be established on the semiconductor wafer 14. The plane of the semiconductor wafer 14 is identified as being the $xy$ plane and is at a focal point of the convex lens 16. In mathematical terms, the light amplitude distribution on the $xy$ plane is given by the equation:

$$h(x,y) = \int\int_{-\infty}^{\infty} F(u,v)G(u,v)e^{-i2\pi/f_2\lambda(ux+vy)}dudv \quad (2)$$

where $f_2$ is the focal length of the convex lens 16. According to the convolution theorem for Fourier transformation, the light amplitude distribution on the $xy$ plane is given by the equation:

$$h(x,y) = \left[\int\int_{-\infty}^{\infty} F(u,v)e^{-i2\pi/f_2\lambda(ux+vy)}dudv\right] *$$

$$\left[\int\int_{-\infty}^{\infty} G(u,v)e^{-i2\pi/f_2\lambda(ux+vy)}dudv\right] \quad (3)$$

where the "*" is the convolution integral. The first integral in equation (3) is the mathematical representation of the pattern on the master image 10 modified by a magnification factor $f_2/f_1$:

$$f(mx,my) = \int\int_{-\infty}^{\infty} F(u,v)e^{-i2\pi/f_2\lambda(ux+vy)}dudv \quad (4)$$

where $m = -f_2/f_1$, the magnification factor. Now if the function $g(x,y)$ is chosen to represent the Fourier transformation of $G(u,v)$ then:

$$g(x,y) = \int\int_{-\infty}^{\infty} G(u,v)e^{-i2\pi/f_2\lambda(ux+vy)}dudv \quad (5)$$

and equation (3) can be written as:

$$h(x,y) = f(mx,my) * g(x,y)$$
$$= \int\int_{-\infty}^{\infty} f(mx'',my'')g(x-x'',y-y'')dx''dy'' \quad (6)$$

Assume the Fourier transformation of the function $G(u,v)$ can be written as:

$$g(x,y) = \sum_{pq} \alpha(x-a_p)\alpha(y-b_q) \quad (7)$$

Then by substitution of equation (7) into equation (6) the function on the $xy$ plane can be written as:

$$h(x,y) = \sum_{pq} f(mx-a_p, my-b_q) \quad (8)$$

where $a_p$ is the distance along the $x$ axis and $b_q$ is the distance along the $y$ axis. Equation (8) mathematically describes the original pattern on the master image 10 reduced and multiplied into an array by the hologram 12. The configuration of the array is described by the function $G(u,v)$; by varying the $a_p$ and $b_q$ terms any array can be generated.

Figure 2:
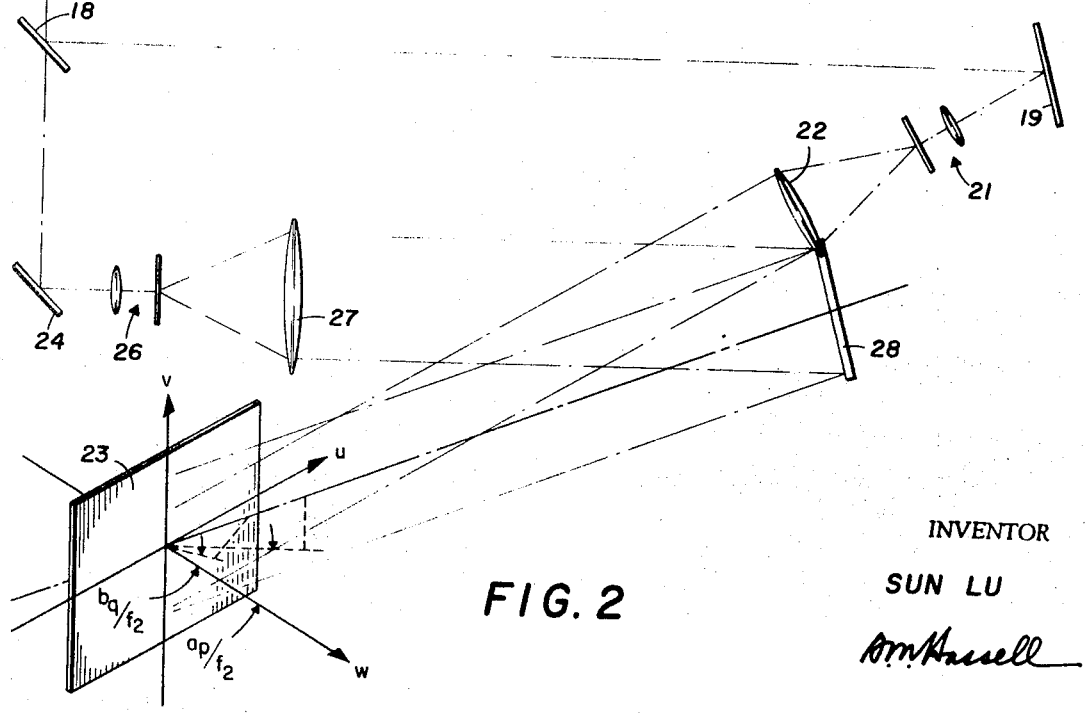
FIG. 2 is a schematic of a system for generating a Fourier transform hologram.

Referring to FIG. 2, there is shown a system for producing a hologram 12 of an array of point sources corresponding with the array of images to be formed from the master image 10. Holograms have frequently been described as modulated diffraction gratings. In the usual method of formation of a hologram, a diffraction pattern is formed on a photographic plate by the interference of a secondary wave with a reference wave. The interference pattern on the photographic plate bears no resemblance to the original object but contains substantially more information than a photograph. To the unaided eye, the image embodied in a hologram cannot be detected since the visible structure is purely extraneous and is the result of a somewhat less than perfect light transmitting system. In the case of a hologram of an array of points, the object can be an array of pinholes arranged in the desired pattern. However, a holograms made by interference of light waves passing through a pinhole array with a reference wave, will not produce high quality images.

In FIG. 2, the hologram is produced by multiple exposure of a photographic plate for each image position to be registered on the photosensitive surface of the semiconductor wafer 14. The system of FIG. 2 includes a laser light source 17 generating a laser beam partially reflected by a reflective surface 18 to a reflective surface 19. The laser beam from the source 17, after reflection from the surface 19, is expanded by a beam expander 21 and collimated by a lens 22. The collimated light from the lens 22 is the reference wave required to generate an interference pattern on a photographic plate 23. Light passing through an aperture in the reflective surface 18 is transmitted to a reflective surface 24 and reflected therefrom to a wave expander 26. Light waves from the expander 26 are collimated by a lens 27 and reflected to the photographic plate 23 by means of an adjustable reflective surface 28.

In operation, the photographic plate 23 is exposed once for each image position desired on the semiconductor wafer 14. For each image position, the reference wave is maintained constant and the object wave varied by means of the adjustable reflective surface 28. Thus, to create the desired multiple image pattern, the adjustable reflective surface 28 is positioned for each exposure. To insure equal intensity images on the photosensitive surface of the semiconductor wafer 14. The same exposure time is used for each image position. Remarkedly good image resolution is possible by the system of FIG. 1 when using a hologram produced by the system of FIG. 2.

This technique of hologram production is known as optical image synthesis and is discussed by D. Garbor et al., Physics Letters 18, No. 2, page 116, Aug. 15, 1965. Optical image synthesis can be shown mathematically; assume the reference wave is defined as:

$$R_w = A_0 e^{-i2\pi cu/f_2\lambda} \quad (9)$$

where $A_0$ is the amplitude of the reference wave and $cu$ is the position of the reference beam with respect to the $uv$ plane. Also, assume that the object wave is given by equation:

$$O_w = A_1 e^{-i2\pi(a_p u + b_q v)/f_2\lambda} \quad (10)$$

where $A_1$ is the amplitude of the object wave. The amplitude of the interference pattern recorded on the photographic plate 23, for each exposure, is equal to the sum of the equations 9 and 10, and is written as follows:

$$A_{pq} = A_0 e^{-i2\pi cu/f_2\lambda} + A_1 e^{-i2\pi(a_p u + b_q v)/f_2\lambda} \quad (11)$$

And, following the discussion of Gabor et al., the amplitude transmission is given by the equation:

$$T(uv) = \alpha_1 + \alpha_2 \left[\sum_{pq} e^{-i2\pi/f_2\lambda \cdot cu} e^{-i2\pi/f_2\lambda(a_p u + b_q v)} + c.c.\right] \quad (12)$$

where $\alpha 1$ and $\alpha 2$ are constants, c.c. is the complex conjugate of $$e^{-i2\pi/f_2\lambda(a_p u + b_q v)}$$

and all the remain terms have been described previously. The direction of the object wave for each image position as it interferes on the photographic plate 23 is given by the terms $a_p/f_2$ and $b_q/f_2$ of equation 12; where $a_p/f_2$ is an angle in the $vw$ plane, as shown in FIG. 2.

The hologram 12 can also be generated by a computer-guided plotter, also known as binary matched filters and low-information content holograms. A low-information content hologram is described by B. R. Brown and A. W. Lohmann in Applied Optics, Volume 5, pages 967–969. The computer-generated hologram consists of a plurality of grating slits of varying width and position. Although the binary matched filter is suitable for multiple image production, there are some approximations involved in the process. To generate the desired pattern, the computer is programmed with the function $G(u,v)$.

Multiple images can also be produced on the photosensitive surface of the semiconductor wafer 14 by substituting a two dimensional grating for the hologram 12. Although it is possible to produce a two dimensional grating of a 30 × 30 array of images with acceptable uniform image intensity, this requires a grating that transmits only about 1/10,000 of the incident light and is therefore very inefficient. Usually some image intensity variation is noticeable in an image pattern produced from such a grating. The quality of the image on the semiconductor wafer 14 depends on the quality of the two dimensional grating; high quality gratings are not too difficult to achieve. The operation of the system shown in FIG. 1 is identical with either a hologram or a two dimensional grating.

Figure 3:
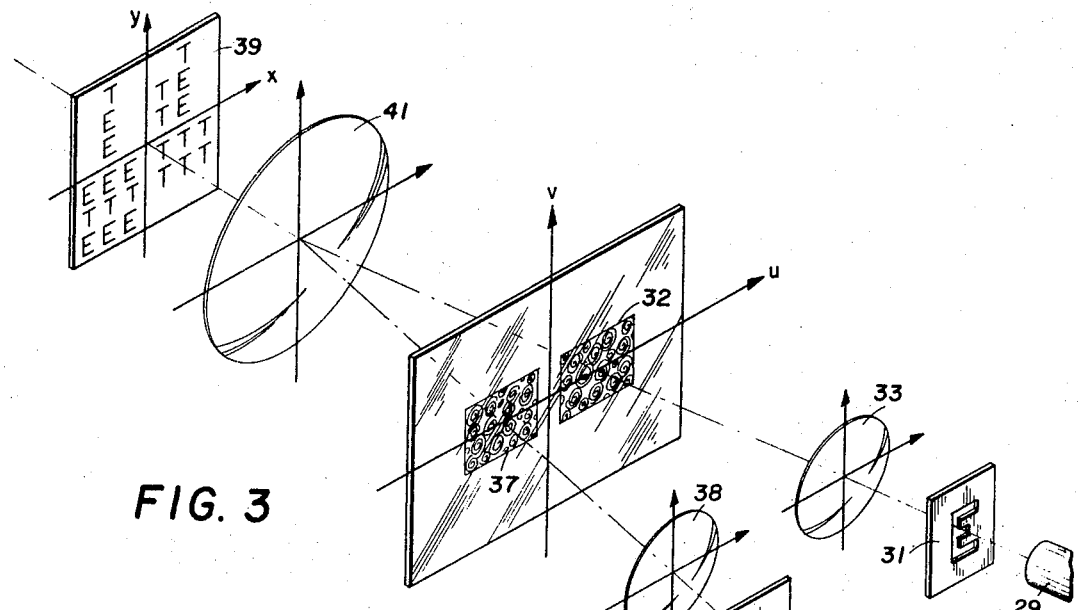
FIG. 3 is a diagrammatic of a system for producing intermixed multiple images from several single image masters.

Referring to FIG. 3 there is shown a system for producing intermixed multiple images of two master images. A source of monochromatic light 29 illuminates the master image 31 thereby generating a diffraction light wave pattern; the Fourier transform of this pattern is established at the hologram 32 by means of a convex lens 33. A source of monochromatic light 34 illuminates a master image 36 thereby generating a complex diffraction waveform; the Fourier transform of which is established at a hologram 37 by means of a convex lens 38. The Fourier transform of the light wave patterns at the holograms 32 and 37 are established at the photosensitive surface of a body such as a semiconductor wafer 39 by means of a convex lens 41.

In operation, the system shown in FIG. 3 operates in substantially the same manner as the system shown in FIG. 1. The equations (1) through (8) would apply for the production of a multiple image pattern from the master image 31, and they would also apply to production of multiple images from the master image 36. Basically, the system of FIG. 3 is merely a duplication of the system of FIG. 1 combined to produce an intermixed multiple image pattern. However, the holograms 32 and 37 are generated on the same photographic plate and the convex lens 41 establishes the Fourier transform of both complex waves at the photosensitive surface of the semiconductor wafer 39.

The holograms 32 and 37 are separately generated on a photographic plate using, for example, the arrangement shown in FIG. 2. Of course, more than two holograms can be generated on the same photographic plate if more than two master images are to be intermixed on the semiconductor wafer 39. Thus, if four master images are to be intermixed to form a multiple image pattern on the semiconductor wafer 39, four holograms would appear on the photographic plate.

Figure 4:
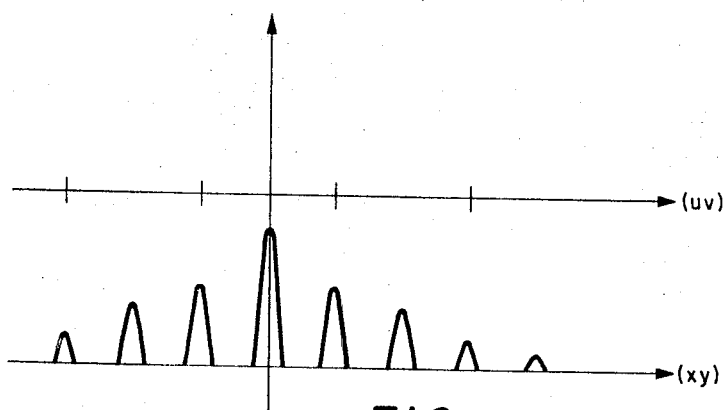
FIG. 4 is a plot of light intensity on a registration element from a two dimensional grating.

Two dimensional gratings cannot be substituted for the holograms 32 and 37 of FIG. 3 since the light diffraction pattern of a grating only generates rectangular arrays. Referring to FIG. 4, there is shown a diffraction pattern for a two dimensional grating. Note, that the apertures in a grating at the uv plane generate a wave on an element in the xy plane that includes a peak at each order of difraction. The peaks do not appear only at the apertures, but in a pattern established in accordance with diffraction theory. A grating of an irregular array of apertures generates a rectangular pattern the same as a grating containing apertures in a rectangular array. If several images are intermixed, the result would be a hodgepodge of the combination of the various master images.

Figure 5:
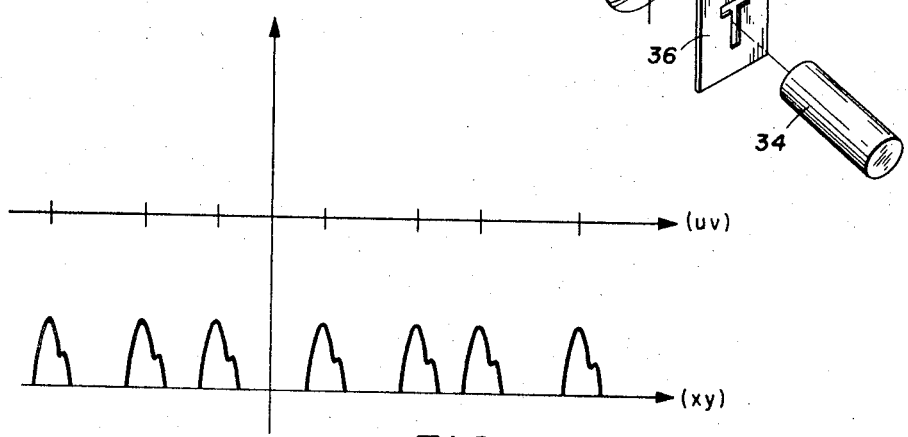
FIG. 5 is a plot of light intensity on a registration element from a hologram.

Referring to FIG. 5, there is shown a curve of the light amplitude on an element in the xy plane when a hologram is used between the convex lenses 13 and 16. The light pattern through a hologram produces distinct and separate irregular patterns at each desired image position. The wave pattern for each image is very narrow and appears only at the image position. Thus, the multiple images produced from one master would not interfere with the multiple images produced from another master, and the images of various master can be intermixed.

With the system of FIG. 3, the multiple images from the various masters can be produced either simultaneously or successively. For simultaneous operation, the master images 31 and 36 are illuminated at the same time and generate the complete intermixed multiple image pattern in one operation. In the alternative, either the master image 31 or 36 is illuminated separately, and the multiple images of the illuminated master produced on the photosensitive surface of the semiconductor wafer 39. After the first pattern has been registered on the semiconductor wafer 39, the second master images is illuminated and multiple images generated on the photosensitive surface of the semiconductor wafer.

It is also possible to produce intermixed multiple images by slight modification of the system shown in FIG. 1. The hologram 12 is replaced by a photographic plate containing a plurality of holograms, one hologram for each master image. The convex lens 13 is made adjustable such that it establishes at the desired hologram, the Fourier transform of the light wave at the master image 10. To generate intermixed multiple images, the various master images are individually inserted in the $x'y'$ plane and the convex lens 13 positioned to establish the Fourier transform at the desired hologram. The multiple image pattern for each master is separately recorded on the photosensitive surface of the semiconductor wafer 14. Thus, if three master images are to be intermixed into a multiple image pattern, three separate operations are required.

A still further modification of the system shown in FIG. 1 to produce an intermixed multiple image pattern replaces the hologram 12 with a photographic plate containing a plurality of holograms, one for each master image. The convex lens 13 remains fixed and a mask is positioned over the photographic plate to block-out all but one hologram pattern. This is also a multiple step operation since each master would be individually placed in the $x'y'$ plane and illuminated from the source 11.

One of the advantages gained from the system of this invention is that the multiple image pattern can be produced without resort to a master pattern. However, if it is found desirable to produce a master pattern, the semiconductor wafer in the xy plane can be replaced by a photographic plate. Either way, the operation of the system is identical; the master image is illuminated from a source of monochromatic light and the Fourier transform of the light waves at said master is generated on the surface of a hologram. A multiple image pattern is generated on the registration element as a result of the combining of the hologram pattern with the Fourier transform of the light waves at said master. To produce an intermixed multiple image pattern, the master images can be illuminated separately or simultaneously as described previously.

While several embodiment of the invention, together with the modifications thereof, have been described herein and shown in the accompanying drawing, it will be evident that various further modifications are possible in the arrangement and construction of its components without departing from the scope of the invention.

What is claimed is:

1. In a method of producing a plurality of identical integrated circuits in a surface of a semiconductor slice wherein said surface is coated with a mask of photoresistive material and after said photoresistive material is applied to the surface of said semiconductor slice and before development-dissolution is effected to form said mask, a pattern on said plurality of integrated circuits is exposed thereon, the step of impinging upon said surface light from a monochromatic light source after serially traversing an alignment of an image of a pattern of one of said plurality of identical integrated circuits, a first lens, a hologram having the Fourier transform of an array of points thereon, and a second lens, thereby to expose said photoresistive material coated on said surface of said semiconductor slice to an array of images of said pattern of one of said plurality of identical integrated circuits, each image in said array of images appearing at a location on said surface of said semiconductor slice corresponding to the location of one of said points in said array of points.

* * * * *